Jan. 7, 1958     J. C. RICH     2,818,747
ADJUSTABLE THROTTLE CONTROL INDICATOR
FOR AUTOMOTIVE VEHICLES

Filed Oct. 22, 1954     2 Sheets-Sheet 1

INVENTOR.
JAMES C. RICH
BY
ATTORNEY

Jan. 7, 1958  J. C. RICH  2,818,747
ADJUSTABLE THROTTLE CONTROL INDICATOR
FOR AUTOMOTIVE VEHICLES
Filed Oct. 22, 1954  2 Sheets-Sheet 2
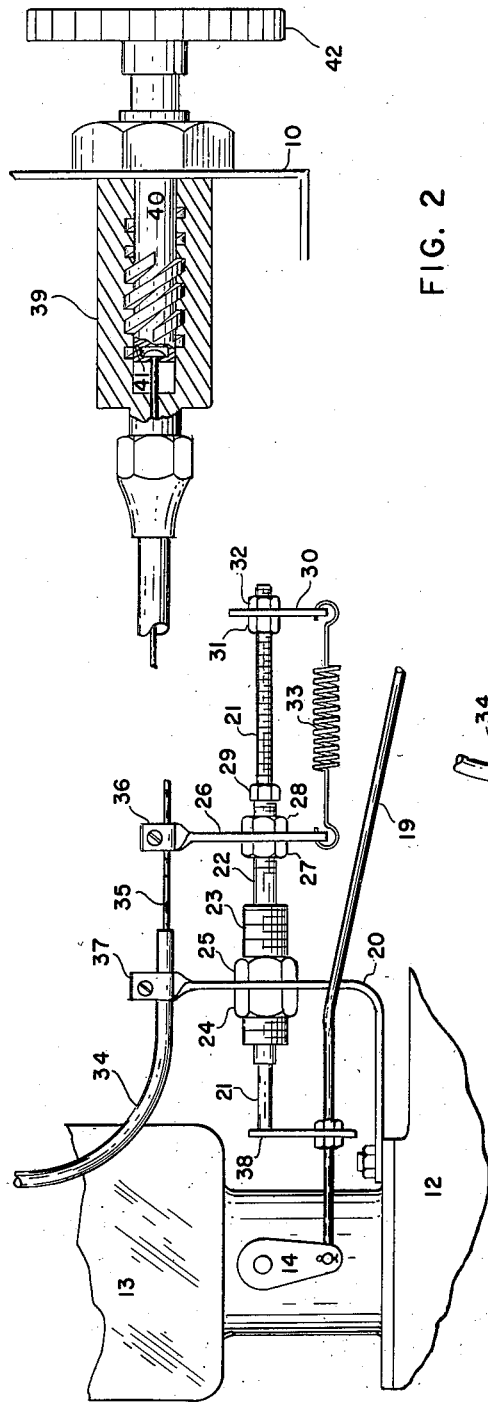
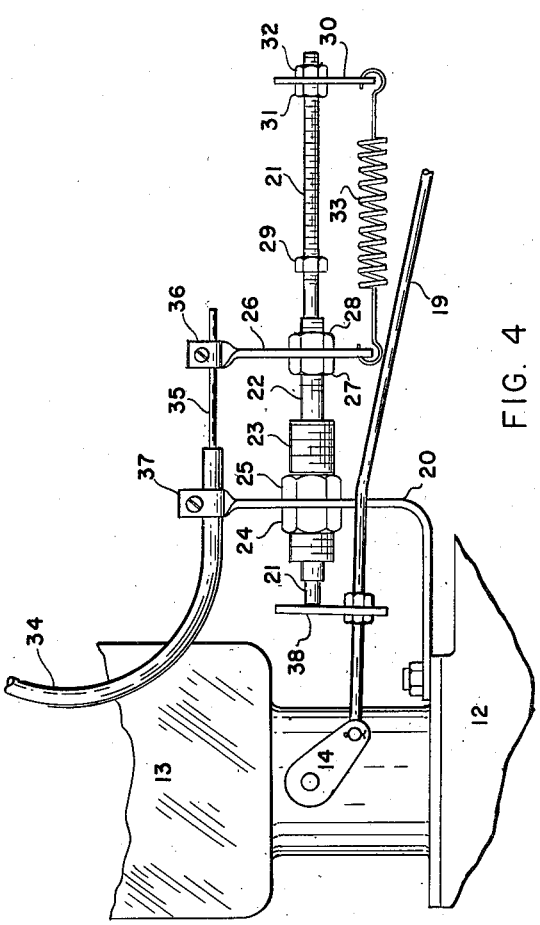
INVENTOR.
JAMES C. RICH
BY
ATTORNEY United States Patent Office 2,818,747
Patented Jan. 7, 1958

2,818,747

ADJUSTABLE THROTTLE CONTROL INDICATOR FOR AUTOMOTIVE VEHICLES

James C. Rich, Portland, Oreg.

Application October 22, 1954, Serial No. 464,074

4 Claims. (Cl. 74—482)

This invention relates in general to devices designed for controlling the supply of fuel to the internal combustion motor of an automotive vehicle as a means for avoiding unintentional excessive speed and also for avoiding unnecessary fuel waste in the starting of an automotive vehicle from rest.

More specifically, this invention relates to means by which the driver of an automobile vehicle will be automatically reminded whenever the rate at which he is causing fuel to be delivered to the motor of the vehicle is such as may be expected to increase the speed of the vehicle beyond a predetermined amount.

It is a recognized fact that a driver of an automotive vehicle may, particularly under favorable driving conditions, involuntarily and unintentionally increase the rate of speed of the vehicle until the speed is considerably in excess of that at which he would be driving if his attention were called to the matter of speed.

It is also a recognized fact that vehicle drivers, when starting up the vehicle, often thoughtlessly cause an excessive amount of fuel to be delivered to the motor at the outset, in an effort to get the vehicle under way more quickly, but with the result that the sudden excessive delivery of fuel causes a waste of fuel and a strain on the motor.

An object of the present invention is to provide a simple means by which the driver of an automotive vehicle will be reminded whenever the speed at which he is driving the vehicle has increased beyond the predetermined and desired speed.

A related object of the invention is to provide such a means which also will apprise the driver of the vehicle of the fact that he is needlessly wasting fuel whenever he presses the accelerator pedal down too far upon starting the vehicle in motion from a state of rest.

An additional object of the invention is to provide a device and control indicator of the nature above indicated which can be quickly and easily set for operation at any predetermined and desired vehicle speed or rate of fuel delivery to the motor, and the setting and resetting of which can be accomplished by the driver from his position in the vehicle.

Another object of the invention is to provide such an indicator control which, although set for a desired and predetermined rate of speed and corresponding rate of delivery of fuel to the motor, will nevertheless in no way prevent the driver of the vehicle from operating the vehicle at greater speed than that for which the control is set if, for any reason, the driver desires temporarily to do so.

A further object of the invention is to provide a control indicator and a settable adjustment for the same which will be simple and inexpensive to produce and which can be easily and quickly adapted and installed for use on any automotive vehicle.

The manner in which these objects are attained and the construction and mode of operation of my simplified and adjustable control indicator will be readily understood from the following brief description with reference to the accompanying drawings.

In the drawings:

Figure 2 is an enlarged section of the setting screw or means mounted on the vehicle dashboard, by which the setting of the device can be altered;

Figure 3 is a fragmentary elevation, similar to Figure 1, showing the device in operative position when the throttle is open to the predetermined desired extent for which the device has been set; and Figure 4 is a corresponding fragmentary elevation illustrating the device when the throttle is open beyond the extent for which the device has been set.

Figure 1:
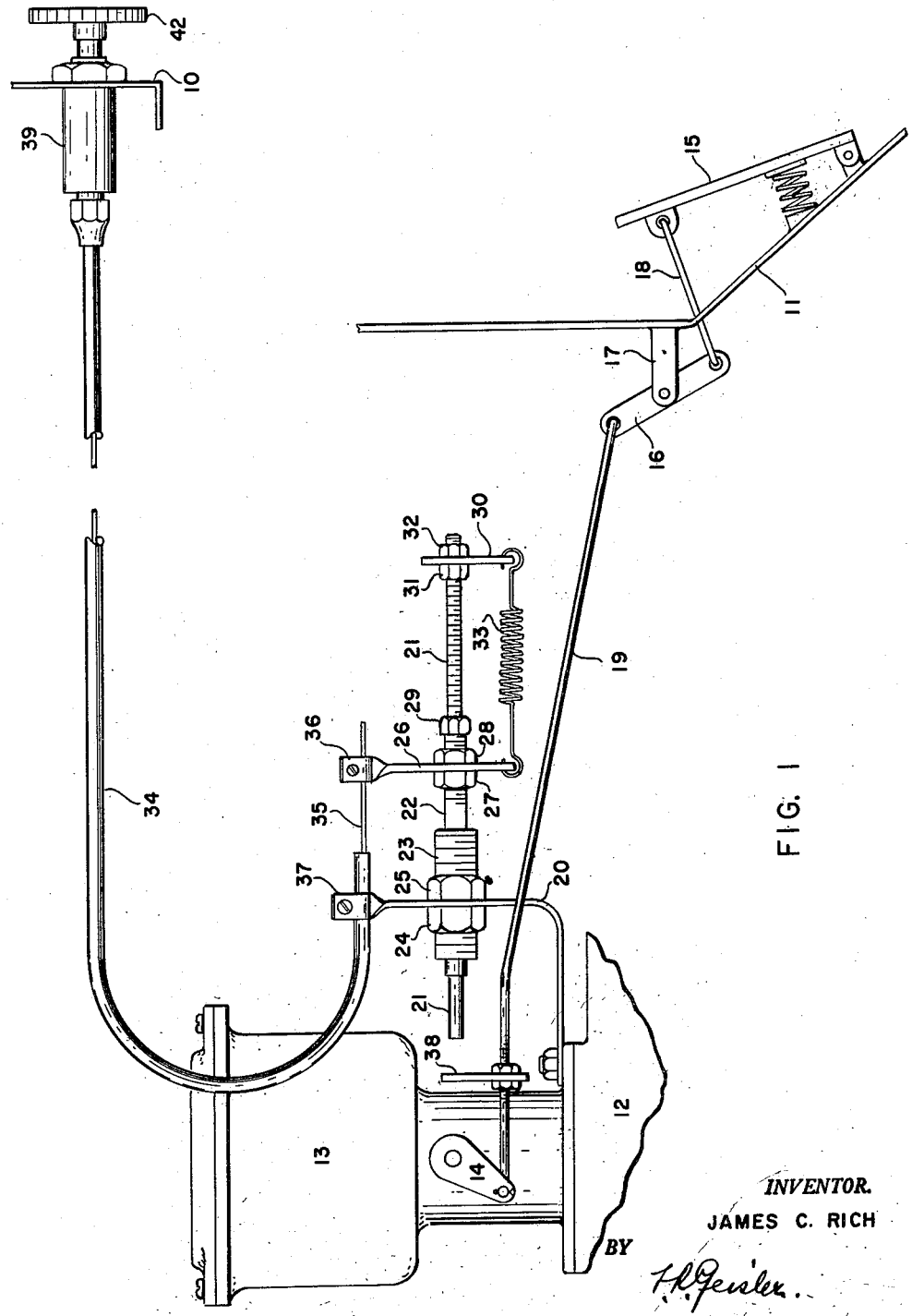
Figure 1 is a fragmentary elevation showing the device in operative position on an automotive vehicle, this figure illustrating the relative position of the parts of the device when the engine throttle of the vehicle is in idling position.

Referring first to Figure 1, in which my device is illustrated as installed in operative position in an automotive vehicle, the engine of the vehicle is indicated in part at 12, the carburator at 13, and the dashboard and footboard, in front of the driver's position in the vehicle, at 10 and 11, respectively.

The customary lever arm 14 is connected with the throttle valve (not shown) and this throttle arm 14 is connected to the accelerator pedal 15, mounted as usual on the footboard 11, by linkage which, in the vehicle illustrated, includes a lever 16 pivotally mounted on the bracket 17, a link 18 connecting the accelerator pedal and lever 16, and the linkage rod 19 connecting throttle arm 14 with lever 16. It is to be understood that the throttle arm linkage is shown merely by way of illustration inasmuch as the actual arrangement and construction of the linkage assembly may vary with different vehicles.

A stationary support, such as the bracket 20, is secured near the throttle linkage, preferably by being mounted on the engine housing. A sleeve 23 extends through an aperture in the bracket 20. The outer surface of this sleeve 23 is threaded and the sleeve is firmly secured to the bracket by clamping nuts 24 and 25. An inner sleeve 22, considerably longer than the outer sleeve 23, is slidably mounted in the outer sleeve 23. The right hand end of the inner sleeve 22 (as viewed in Figure 1) is threaded, and a pair of clamping nuts 27 and 28 secure an arm 26 firmly on the end of the sleeve 22.

An indicator rod 21 is slidably mounted in the inner or bearing sleeve 22 and extends beyond both ends of the inner sleeve 22. The right hand half of this indicator rod 21 (as viewed in Figure 1) is threaded. A spring-holding member or arm 30 is adjustably secured on or near the outer end of the indicator rod 21 by the nuts 31 and 32. A coil spring 33 has one end attached to the member 30 and the other end attached to the arm 26. A stop nut 29 is adjustably mounted on the indicator rod 21 between the arm 26 and the member 30 and, by its engagement with the end of the sleeve 22 or the mounting for the arm 26, limits the extent to which the indicator rod 21 can be moved by the spring 33. The spring 33 is always under tension when my control device is operatively installed in place on a motor vehicle.

A control positioning wire 35 has one end secured to the arm 26 by means of the clamp 36. The other end of the control wire 35 is attached to adjustable means, to be explained later, which is positioned at a convenient location, preferably on the vehicle dashboard, for manipulation by the driver of the vehicle.

A rod-engaging element or arm 38 is mounted on the throttle linkage rod 19 in such location as to engage the end of the indicator rod 21 (thus the opposite end of the rod from that to which the spring 33 is attached), whenever the throttle is opened an appreciable amount. It will be apparent that when the engaging element 38 is secured in position on the throttle linkage rod 19 the extent to which the throttle can be opened, thus the extent to which the throttle linkage rod 19 can be moved to the right in Figure 1, before engaging the indicator rod 21, will depend on the position at which the indicator rod 21 is set. This, in turn, is determined by the positions of the stop nut 29 and of the arm 26.

Let it be assumed now that my control indicator is desired to indicate to the driver of the vehicle whenever the rate of fuel supply to the engine is such as would produce normal speed of the vehicle at 35 M. P. H. In other words, whenever the throttle is opened sufficiently to produce this desired vehicle speed under normal conditions it is desired that this condition be indicated to the driver. The stop nut 29 and the arm 26 accordingly are so set that the end of the indicator rod 21 will be engaged by the element 38 of the throttle linkage when the throttle has been opened to this desired extent. Any further opening of the throttle will encounter increased resistance on the part of the spring 33. Thus the driver will be reminded, through the foot pressure which he is required to exert on the accelerator pedal of the vehicle, that the particular speed or amount of throttle opening, for which the indicator has been set, has been reached. While the driver is not prevented from increasing the vehicle speed beyond such point, this will not then be done unintentionally.

The adjusting of the position of the indicator rod 21 can be done entirely by adjusting the stop nut 29 on the rod 21 with the arm 26 fixed in position. Thus if the device is to be adjusted for indicating a 30 M. P. H. speed instead of the 35 M. P. H. speed, this could be done entirely by adjusting the stop nut 29 to cause the indicator rod 21 to have its normal position moved a sufficient distance to the left (as viewed in Figure 1). However, such adjustment could also be made by moving the arm 26 (and therewith the inner bearing sleeve 22) also the required distance to the left. This latter adjustment is accomplished more conveniently by the driver through the intermediary of the control positioning wire 35.

The control positioning wire 35 is slidably housed in a flexible conduit 34. One end of the conduit 34 is secured by the clamp 37 to the stationary bracket 20. The other end of the conduit 34 is connected by suitable means, for example by threaded socket and nipple, to the end of a housing 39 (see also Figure 2) which, in turn, is secured to the dashboard 10 of the vehicle. The housing 39 has a cylindrical channel which is provided with threads to engage the corresponding threads on a setting screw 40. The setting screw 40 extends out from the end of the housing and out from the vehicle dashboard and carries a suitable finger knob 42 at its outer end. The end of the positioning wire 35 extends beyond the end of the conduit 34 and passes through an aperture in the inner end of the housing 39 and is attached to the inner end of the setting screw 40 by a rotatable joint connection indicated at 41 in Figure 2. It will now be apparent that rotation of the finger knob 42 will produce movement of the positioning wire 35 which in turn will adjust the position of the arm 26 (and sleeve 22 and indicator rod 21) with respect to the supporting sleeve 23 and bracket 20.

Thus when the device has been set to indicate a throttle position for a speed of 35 M. P. H. and the driver desires to adjust this for indicating a speed of 30 M. P. H. he is able to do so quickly and easily merely by turning the finger knob 42. Preferably with such arrangement a mark and indicator scale or other suitable indicia will be carried by the knob and the surface surrounding its screw shaft. Obviously also other manual setting means for the positioning wire 35 could be mounted on the dashboard for accomplishing the same purpose. The particular means which I have illustrated in Figure 2 for this purpose I consider preferable because it can be made very simply and will be accurate and dependable from the operation standpoint.

The functioning of my control indicator as previously described will also be readily understood from the comparison of Figures 1, 3 and 4. In all three figures it is assumed that the device has been set for a predetermined desired vehicle speed and rate of fuel supply to the vehicle engine. Figure 1 illustrates the position of the various members of the assembly when the throttle is in idling position. Figure 3 illustrates the positioning when the throttle has been opened to the extent normally to produce the predetermined desired vehicle speed. Figure 4 illustrates the corresponding position when the throttle is opened beyond the predetermined extent, under which condition the driver is obliged to exert the extra pressure on the accelerator pedal to overcome the added resistance of spring 33, as previously mentioned. The tension of spring 33 can be adjusted to suit the desire of the individual driver by adjusting the position of the spring-holding member 30 on the indicator rod 21 by means of the adjustable clamping nuts 31 and 32.

Indicating to the driver when the throttle has been opened to the predetermined extent for which the indicator control has been set not only reminds the driver when the desired speed has been attained by the moving vehicle but also will indicate to him the extent to which the throttle is opened and the rate at which fuel is being supplied to the engine as the vehicle is started from rest. This provides an aid in preventing the driver from causing an excess of fuel to be delivered to the engine when the engine is starting, and thus aids in preventing a waste of fuel at such time.

Minor variations could be made in my improved throttle control indicator without departing from the principle of my invention, but the construction and arrangement of the parts of my device, as I have illustrated and described them, I consider to be the preferred construction for the carrying out of my invention.

I claim:

1. In an automotive vehicle having a throttle valve and an accelerator pedal and linkage connecting said pedal with said valve, an adjustable throttle control indicator including a slidable rod, a supporting bracket, a stationary outer sleeve secured in said supporting bracket, an inner sleeve slidable in said outer sleeve and extending beyond said outer sleeve, said rod slidably mounted in said inner sleeve, a settable arm secured on said inner sleeve, spring means exerting a force tending to move said rod in one direction with respect to said arm, a stop on said rod limiting the movement of said rod with respect to said arm under the force of said spring means, an engaging element on said linkage so positioned as to engage said rod and move said rod against the force of said spring means when said throttle is being opened, whereby further opening of said throttle after said element has engaged said rod will be resisted by said spring means, the position of said arm determining the extent to which said throttle can be opened before said element engages said rod, a conduit having one end mounted at the vehicle dashboard and the other end secured to said supporting bracket, a control wire extending through said conduit, one end of said wire secured to said arm, and manually operable control setting means connected to the other end of said wire at the vehicle dashboard, whereby the position of said arm can be adjustably set from the vehicle dashboard.

2. In an automotive vehicle having a throttle valve and an accelerator pedal and linkage connecting said pedal with said valve, an adjustable throttle control indicator including a rod located adjacent a portion of said linkage, supporting means for said rod, said rod slidable in said supporting means, spring means under constant tension connected with said rod constantly exerting a force to slide said rod in one direction, a rod-engaging element on said linkage for engaging an end of said rod to slide said rod against the force of said spring means when said linkage is moved a sufficient distance in the opening of said throttle to cause said element to contact said rod end, adjustable limit means for said rod limiting the sliding of said rod in one direction under the force of said spring means and thereby controlling the location at which said rod will be engaged by said element on said linkage, and means for adjusting said adjustable limit means.

3. In an automotive vehicle having a throttle valve and an accelerator pedal and linkage connecting said pedal with said valve, an adjustable throttle control indicator including a rod located adjacent a portion of said linkage, a support for said rod, said rod slidable in said support, an adjustable spring under constant tension connected with said rod constantly exerting a force to slide said rod in one direction, a rod-engaging arm on said linkage for engaging an end of said rod to slide said rod against the force of said spring when said linkage is moved a sufficient distance in the opening of said throttle to cause said arm to contact said rod end, adjustable limit means for said rod limiting the sliding of said rod in one direction under the force of said spring and thereby controlling the location at which said rod will be engaged by said arm on said linkage, and means operable from the dashboard of the vehicle for adjusting said adjustable limit means.

4. In an automotive vehicle having a throttle valve and an accelerator pedal and linkage connecting said pedal with said valve, an adjustable throttle control indicator including a stationary support located near a portion of said linkage, a sleeve slidably mounted in said support, a rod slidably mounted in said sleeve, a settable arm secured on said sleeve, an adjustable tensioned spring constantly exerting a force tending to move said rod in one direction with respect to said arm and sleeve, a stop on said rod limiting the movement of said rod with respect to said arm and sleeve under the force of said spring, an engaging element on said linkage so positioned as to engage said rod and move said rod against the force of said spring, when said throttle is being opened, whereby further opening of said throttle after said element has engaged said rod will be resisted by said spring, the position of said arm and sleeve determining the extent to which said throttle can be opened before said element engages said rod, and means for adjusting the position of said arm and sleeve.

References Cited in the file of this patent

UNITED STATES PATENTS

| 1,575,826 | Goetz | Mar. 9, 1926 |
| 2,130,578 | Baker | Sept. 20, 1938 |
| 2,186,620 | Aprea et al. | Jan. 9, 1940 |
| 2,240,919 | Weintraub et al. | May 6, 1941 |
| 2,385,597 | Russell | Sept. 19, 1944 |